Jan. 21, 1964 L. E. HUNT 3,118,437
MEANS FOR CONCENTRATING SOLAR ENERGY
Filed Aug. 8, 1961 3 Sheets-Sheet 2

ARRAY OF MIRRORS HAVING A FOCAL LINE NORMAL TO THAT OF MIRROR 3

INVENTOR.
L. E. Hunt
BY
ATTYS.

Jan. 21, 1964     L. E. HUNT     3,118,437
MEANS FOR CONCENTRATING SOLAR ENERGY
Filed Aug. 8, 1961     3 Sheets-Sheet 3

INVENTOR.
L. E. Hunt
BY
ATTYS.

United States Patent Office 3,118,437
Patented Jan. 21, 1964

3,118,437
MEANS FOR CONCENTRATING SOLAR ENERGY
Llewellyn E. Hunt, 67 Victoria Ave., Vereeniging,
Transvaal, Republic of South Africa
Filed Aug. 8, 1961, Ser. No. 130,117
Claims priority, application South Africa Sept. 15, 1960
5 Claims. (Cl. 126—270)

The present invention relates to an improved means for concentrating solar energy, more particularly for the utilisation of said solar energy for the purpose of heating.

A great number of appliances utilising solar energy rely on the concentration of solar energy by suitable means, e.g. by means of a reflective surface or surfaces. A concave reflective surface curved in three dimensions or assimilating a three-dimensional curvature has hitherto been found to be the most suitable and effective, as rays from all parts of the reflective surface are concentrated substantially on one point. Being curved in three dimensions, however, raises the cost considerably and in fact makes it prohibitive in some cases.

It is the object of the present invention to provide a means for concentrating solar energy easily, economically and efficiently.

It is a further object of the invention to provide a system by means of which solar energy may be projected downwards onto a point so that in the case of a melting pot or the like, the solar energy may pass into said pot or the like through the opening at the top instead of through the sides.

Further objects, advantages and applications of the invention will become apparent from the following description.

A means for concentrating solar energy in accordance with the invention comprises a system of two reflective surfaces or two sets of reflective surfaces facing each other, each of which has or produces the effect of a two-dimensional concave curvature, said reflective surfaces being arranged so that the one reflective surface or set of reflective surfaces faces the sun, herein referred to as collector mirror, and so that the parallel rays of the sun falling thereon are reflected onto the second reflective surface, which has its back to the sun and is herein referred to as a duplex mirror, in such a manner that in planes parallel to the effective axes of curvature of the first reflective surface or set of surfaces, the rays continue to proceed parallel to one another towards the second reflective surface, whereas in planes normal or at an angle thereto, the rays are converging, said second reflective surface reflecting the rays in such a manner that after reflection from the second surface or set of surfaces the rays will also converge in those planes in which they were formerly parallel, while the degree of convergence produced by the first reflective surface or set of surfaces remains substantially unchanged, the effective axes of curvature of the second surface or set of surfaces being normal to the effective axes of curvature of the first surface or set of surfaces and in which the focal length of the two-dimensionally curved collector mirror or reflective surface is greater than that of the corresponding "duplex" mirror or reflective surface, the reflective surfaces or mirrors further being arranged in such a way that the sum of the distances between the collector mirror or reflective surface and the "duplex" mirror or reflective surface and between the "duplex" mirror or reflective surface and the point of application corresponds to or approximates the focal length of the collector mirror or reflective surface whilst the distance between the "duplex" mirror or reflective surface and said point of application corresponds to or approximates the focal length of said "duplex" mirror or reflective surface, the total effect being to cause all the rays striking the first reflective surface to converge onto substantially one point or limited area.

The effective curvature of both the collector mirror and that of the duplex mirror, each preferably is or corresponds to a parabola.

In a particular embodiment of the invention the curved reflective surface comprises a number of relatively narrow, flat reflective members placed side by side so as to approach in effect a parabola and to approximate the effect of a continuously curved surface.

In a preferred embodiment of the invention the relatively narrow, flat, reflective members are so mounted that the curvature of the parabola may be altered to whatever shape and whenever desired or required.

The "duplex" mirror or reflective surface, preferably having a parabolic curvature or the approximate effect of parabolic curvature, may be similar to a "drive-in" cinema screen. The "duplex" mirror or reflective surface is preferably somewhat smaller than the collector mirror or reflective surface and is positioned a suitable distance from the collector mirror or reflective surface and some distance off the ground.

The collector mirror or reflective surface or set of reflective surfaces may be mounted upon a track or the like, said track preferably being circular so that the collector mirror or set of reflective surfaces may be rotated in accordance with the position of the sun in such a manner that it always faces the sun.

The "duplex" mirror or reflective surface is preferably also mounted on a track or the like, so that it may be adjusted to any desired position, so that rays from the collector mirror or reflective surface are always reflected onto said "duplex" mirror or reflective surface.

In a preferred embodiment of the invention, both the collector mirror or reflective surface or set of reflective surfaces, and the "duplex" mirror or reflective surface may be tilted in any direction so that a maximum concentration of rays fall onto said mirrors or reflective surfaces.

The mirrors or reflective surfaces may be constructed of any suitable material, e.g. metal or alloy, having a reflective surface. The reflective surfaces are preferably hardened so as to prevent damage or dulling by the elements of the weather.

In a particular embodiment of the invention, if the energy is to be used to melt metals or the like in a melting pot or the like, the mirrors or reflective surfaces are so arranged that the rays are reflected downwards onto the melting pot or the like, so that said rays pass through the open end into said pot or the like instead of through the walls.

In one embodiment of the invention, the melting pot may be tilted so that the open end can always be turned towards the reflected sun rays.

The melting pot or boiler or the like is preferably stationary whilst the reflective surfaces may be moved to follow the sun.

The invention and the manner in which it may be put into practice will be further described by way of the following examples with reference to the drawings without thereby limiting the scope of the invention.

Figure 1:
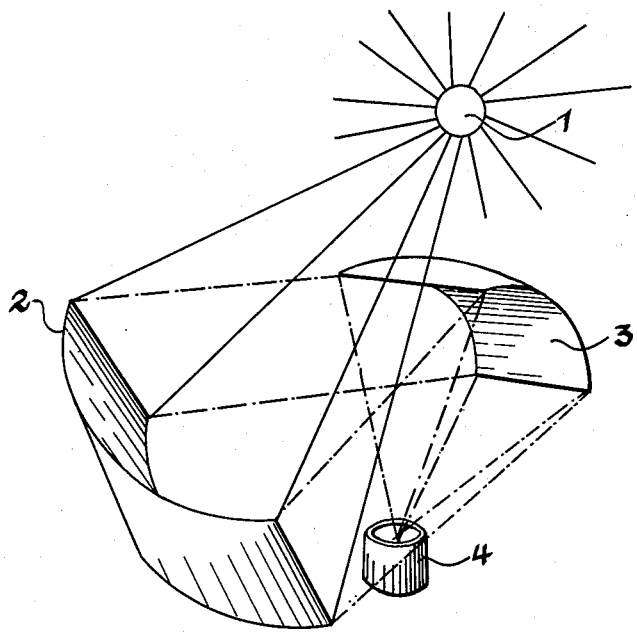
FIGURE 1 is a schematic perspective representation of a solar energy concentrating device in accordance with the invention.

Referring to FIGURE 1: Parallel rays from the sun 1 strike a concave collector mirror 2 having a two-dimensional curvature and are reflected by said collector mirror 2 onto a "duplex" mirror 3, which is concave and has a two-dimensional curvature, the curvature being in a plane which is substantially perpendicular to the plane of curvature of the collector mirror 2, and said "duplex" mirror 3 being somewhat above the collector mirror 2 and within the focal length of said collector mirror 2. The rays caused to converge by the collector mirror 2, are reflected by the "duplex" mirror 3 and continue converging until they meet at a point 4 within a melting pot 5. The parallel rays striking the "duplex" 3 are caused to converge by said "duplex" mirror 3, the curvature of which is such that its focal length corresponds to the distance between point 4 within the melting pot 5 and said "duplex" mirror 3, so that the parallel rays striking the "duplex" mirror 3 are caused to converge and meet at point 4.

All rays striking the collector mirror 2 have thus been caused to converge onto one point by means of two mirrors each having a two-dimensional curvature.

The melting pot 5 is below the "duplex" mirror 3 so that the rays from said "duplex" mirror 3 fall downwards into the melting pot thus obviating the necessity for said rays to pass through the walls of said melting pot 5.

Figure 2:
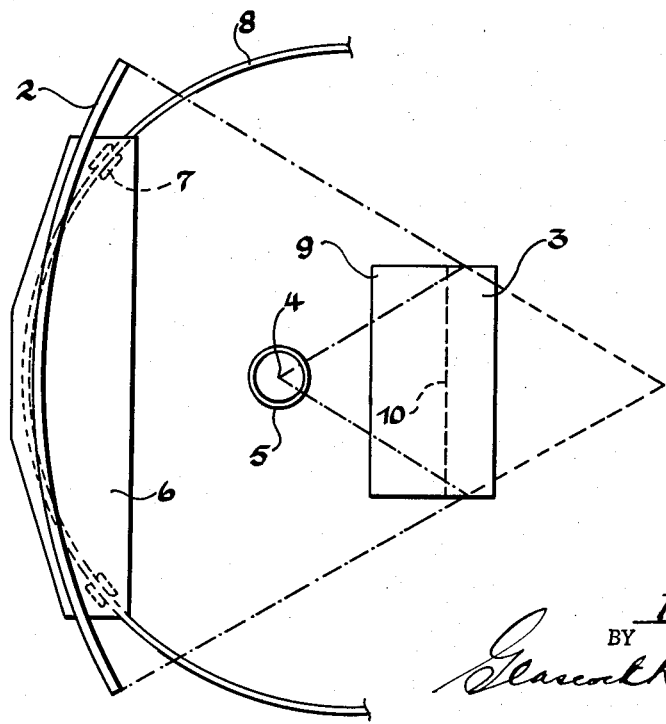
FIGURE 2 shows a plan view of a solar energy concentrating device in accordance with the invention.

Referring to FIGURE 2: The concave collector mirror 2 with two-dimensional curvature is mounted on a support 6, which has wheels 7 by which means it runs on a track 8. The collector mirror 2 may thus be rotated on the circular track 8. The rays from the collector mirror 2 are caused to converge and strike a "duplex" mirror 3 having an upper edge 9 and a lower edge 10, the "duplex" mirror 3 being positioned within the focal length of the collector mirror 2. The rays converging from the collector mirror 2 strike, and are reflected by, the "duplex" mirror 3 and continue converging until they meet at point 4 within the melting pot 5. As the sun makes its path across the sky the collector mirror 2 is rotated on rails 8 so that it always faces the sun. The "duplex" mirror 3 is similarly rotated so that it always has its back to the sun and is in such a position that the rays reflected by the collector mirror 2 fall on said "duplex" mirror 3.

Both the "duplex" and the collector mirror may also be tilted so as to receive the maximum concentration of sun rays.

Figure 3:
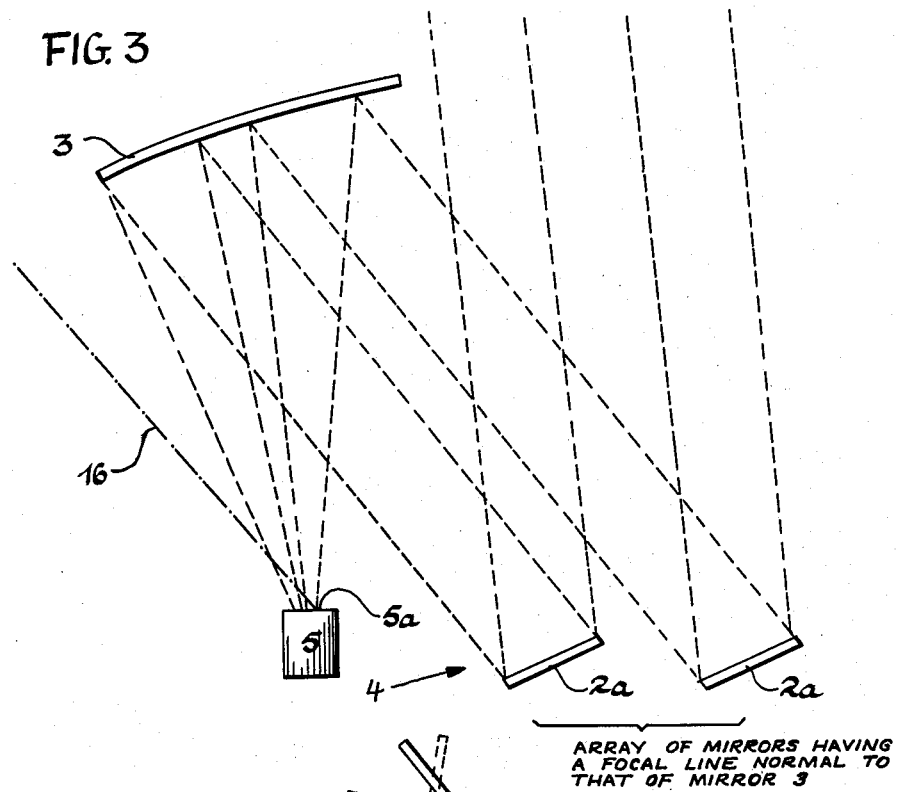
FIGURE 3 is a diagrammatic vertical section through a solar energy concentrating installation in accordance with the invention.

Referring to FIGURE 3: The rays from the sun 1 fall onto a set of reflective surfaces 2a, said reflective surfaces 2a being so arranged that they produce in combination the effect of a concave parabolic collector mirror reflecting the rays of the sun onto a duplex mirror 3, said "duplex" mirror 3 having a two dimensional curvature. The rays of the sun, which are caused to converge by the reflective surfaces 2a forming the concave collector mirror strike the concave "duplex" mirror 3 by means of which they are re-reflected, their degree of convergence, produced by the first set of reflective surfaces 2a, remaining substantially unchanged. The rays on striking the "duplex" mirror are in addition caused to converge by said "duplex" mirror 3, in a plane normal to the plane of convergence produced by the collector mirror, said rays being reflected into a melting pot 5 by means of said duplex mirror 3. The mirrors are so arranged that the focal line of the duplex mirror intersects the mirror image of the focal line of the collector set of mirrors at approximately right angles in a focal point or an approximation thereof. The melting pot 5 is set up so that the converging rays form the duplex mirror 3, upon being re-reflected will enter through opening 5a and so that the focal point falls inside said melting pot 5. The reflective surfaces 2a may be tilted and turned (dotted lines) so that the maximum concentration of rays from the sun 1 may always fall onto said reflective surfaces 2a. The plane of symmetry of the parabola is given by the dot-dashed line 16. It is clearly shown, therefore, that the duplex mirror 3 has the curvature of a section of a parabola, which is not by itself symmetric about any line of symmetry, but which is located at one side of the plane of symmetry 16 of the complete parabola. This feature introduces the advantage that the focal point at 5 of the rays is positioned outside the path of the rays being reflected from the collector mirror to the duplex mirror 3 and that no part of the duplex mirror will present an obstacle to the rays reflected from the collector mirror.

When placed behind each other as shown in FIGURE 3, the reflective surfaces 2a must be so arranged that they in no way interfere with the reflected rays of light from any of the other reflective surfaces. The reflective surfaces 2a may be tilted and turned so as to allow the maximum concentration of sunlight to fall on them at all times.

Figure 4:
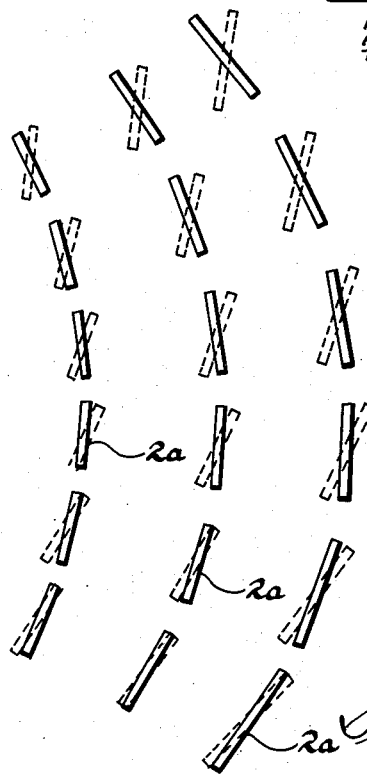
FIGURE 4 shows a side view of an arrangement of reflective surfaces forming a collector mirror in accordance with the invention, such as in the direction of arrow 4 in the embodiment of FIGURE 3.

Referring to FIGURE 4: A number of reflective surfaces 2a are mounted on concentric arcs of circles or parabola and each surface is at such an angle to the sun and the remainder of the installation that the system of reflective surfaces produces the effect of a concave collector mirror having a two-dimensional curvature. The reflective surfaces 2a on the arcs are mounted in such a manner that the reflective surfaces 2a of the one arc do not interfere with the reflected rays from the reflective surfaces 2a of any other arc. (See FIGURE 3.) The reflective surfaces 2a may be tilted or turned about a horizontal as well as about a vertical axis. The reflective surfaces 2a may be turned about a vertical axis so that the system of reflective surfaces always produces the effect of a concave collector mirror with a two-dimensional curvature facing the sun and concentrating all collected solar energy on the "duplex" mirror, which is, of course, also moved and turned in conjunction with the collector surfaces.

Figure 5:
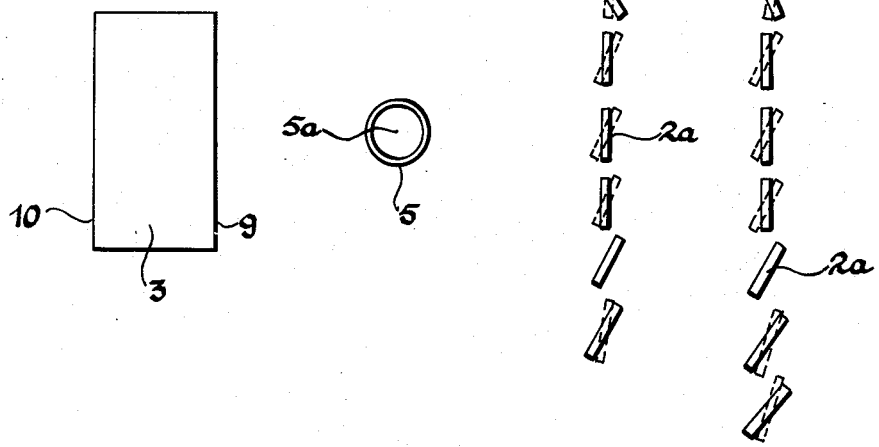
FIGURE 5 shows a plan view of a further arrangement of a solar energy concentrating device in accordance with the invention.

Referring to FIGURE 5: A number of reflective surfaces 2a are positioned on a straight line in such a manner that by turning and tilting the individual reflective surfaces the system of reflective surfaces always has the approximate effect of a concave collector with a two-dimensional parabolic curvature facing the sun. A second line of reflective surfaces 2a is set up behind the first and if desired or required any number of further lines may be set up. The reflective surfaces are so positioned that they do not interfere with the reflected rays from the reflective surfaces 2a behind them, so that all rays reflected by said reflective surfaces 2a in all the lines fall onto the duplex mirror 3 having an upper edge 9 and a lower edge 10 by means of which the rays are reflected and concentrated within the melting pot 5.

Figure 6:
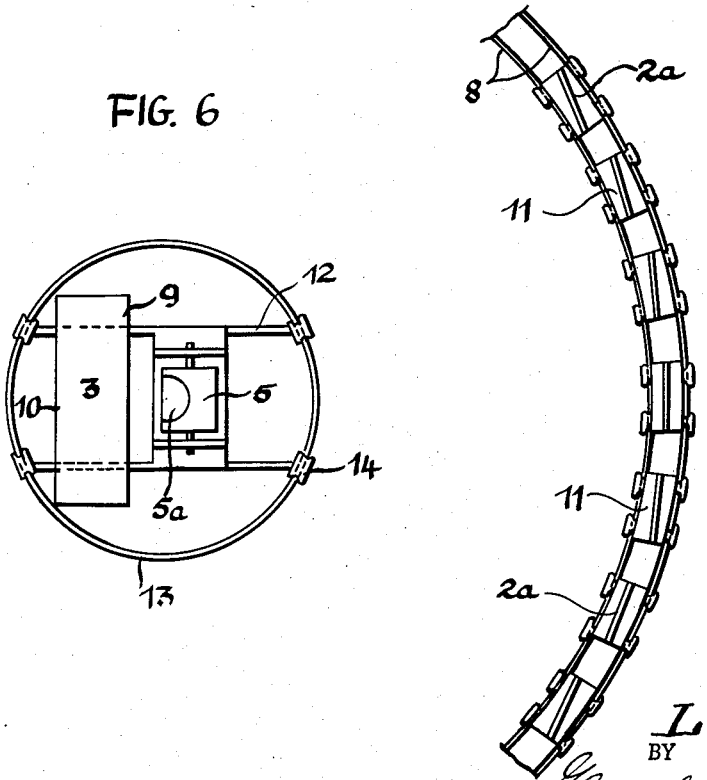
FIGURE 6 is a plan view of yet another arrangement of a solar energy concentrating device in accordance with the invention.

Referring to FIGURE 6: A set of reflective surfaces 2a are mounted on a set of carriages 11, which carriages 11 in turn run on a set of tracks 8, said tracks 8 being circular. The individual reflective surfaces 2a on the carriages 11 viewed in plan, are partly at a fixed angle to the tracks so that the system of reflective surfaces 2a will produce the effect of a concave collector mirror having a two-dimensional curvature and they may further each be tilted about a horizontal axis so as to ensure that a maximum concentration of sunlight will always be reflected onto the "duplex" mirror 3 having an upper edge 9 and a lower edge 10, by means of which "duplex" mirror 3 said rays are re-reflected and concentrated within a melting pot 5. The "duplex" mirror 3 may also be tilted so as to receive the maximum concentration of the rays from the reflective surfaces 2a forming the collector mirror system. Both the "duplex" mirror 3 and the melting pot 5 are mounted upon a carriage 12 which runs on a track 13 by means of wheels 14. The track 13 is circular so that both the "duplex" mirror 3 and the melting pot 5 may always be revolved whenever the system of reflective surfaces 2a forming the collector mirror is turned, so as to ensure that the reflected rays from the reflective surfaces 2a fall onto the "duplex" mirror 3 and are concentrated in the melting pot 5. The melting pot 5 is further mounted on an axis so that it may be tilted so as to ensure that the rays of light reflected from the "duplex" mirror 3 will fall into said melting pot 5.

What I claim is:

1. Means for concentrating solar energy comprising a collector system and a duplex reflector system facing toward each other, each system including at least one reflecting surface forming a two-dimensional structure of concave essentially parabolic curvature, said collector system being movably positioned to receive the rays of the sun and the duplex reflector system being positioned to face away from the sun, the effective curvatures of the respective systems and their focal lines being in planes normal to one another, the effective curvature of the duplex reflector system corresponding essentially to a section of the outlines of one arm only of a parabola terminating short of the apex of said parabola, the focal length of the collector system exceeding that of the duplex reflector system, said duplex reflector system being positioned to intercept reflected light rays from the collector system at a distance from the collector system less than the distance to the focal line of the collector system, the distance of the duplex reflector system from the focal line of the collector system being equal to the distance to the focal line of the duplex reflector system to cause the rays of light striking the collector system to converge onto substantially one fixed point-like limited area always outside the path of the rays reflected from the collector system after reflection from the duplex reflector system in any position of the collector system.

2. Means for concentrating solar energy as claimed in claim 1, in which the duplex reflector system is so positioned that its optical focal line is parallel to the ground.

3. A means for concentrating solar energy as claimed in claim 1 in which the energy is to be used to melt metals in a melting pot, said reflecting surfaces being positioned to cause the rays from the duplex reflector system to be reflected downwards through the open end of the melting pot, said melting pot furthermore being tiltable so that the open top of the pot can be positioned to face the reflected sun rays.

4. A means for concentrating solar energy as claimed in claim 1 in which the collector system comprises a number of relatively narrow, flat reflective members placed side by side so as to approach in effect a parabola and to approximate the effect of a continuously curved surface.

5. A means for concentrating solar energy as claimed in claim 4 in which the individual relatively narrow, flat, reflective members are mounted by means of mounting means allowing of movement having an angular component, so that the curvature of the parabola may be altered to whatever shape and whenever required.

References Cited in the file of this patent

UNITED STATES PATENTS

| | | |
|---|---|---|
| 509,392 | Paine | Nov. 28, 1893 |
| 683,088 | Wideen | Sept. 24, 1901 |
| 797,891 | Himalaya | Aug. 22, 1905 |
| 1,386,781 | Harvey | Aug. 9, 1921 |
| 1,698,905 | Beechlyn | Jan. 15, 1929 |
| 1,951,404 | Goddard | Mar. 20, 1934 |
| 2,291,534 | Deppe | July 28, 1942 |
| 2,471,954 | Harvey | May 31, 1949 |
| 2,945,417 | Caryl et al. | July 19, 1960 |

FOREIGN PATENTS

| | | |
|---|---|---|
| 751,050 | Great Britain | June 27, 1956 |